United States Patent
Naserian et al.

(10) Patent No.: US 10,676,979 B2
(45) Date of Patent: Jun. 9, 2020

(54) SYSTEM AND METHOD FOR CONTROLLING AN AUTOMATIC LIFTGATE IN A MOTOR VEHICLE

(71) Applicant: GM Global Technology Operations LLC, Detroit, MI (US)

(72) Inventors: Mohammad Naserian, Windsor (CA); Allan K. Lewis, Windsor (CA); Michael T. Chaney, Jr., Royal Oak, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 61 days.

(21) Appl. No.: 16/161,888

(22) Filed: Oct. 16, 2018

(65) Prior Publication Data
US 2020/0115951 A1    Apr. 16, 2020

(51) Int. Cl.
*E05F 15/73* (2015.01)
*B60J 5/10* (2006.01)

(52) U.S. Cl.
CPC ............... *E05F 15/73* (2015.01); *B60J 5/102* (2013.01); *B60Y 2400/3015* (2013.01); *E05F 2015/767* (2015.01); *E05Y 2900/546* (2013.01)

(58) Field of Classification Search
CPC ......... E05F 15/73; E05F 15/767; B60J 5/102; B60Y 2400/3015
USPC ............................................................ 701/49
See application file for complete search history.

(56) References Cited

U.S. PATENT DOCUMENTS

| | | | |
|---|---|---|---|
| 9,068,390 B2* | 6/2015 | Ihlenburg | E05F 15/73 |
| 2009/0065988 A1* | 3/2009 | Rana | F16F 9/0254 |
| | | | 267/64.12 |
| 2011/0215916 A1* | 9/2011 | Boehme | E05F 15/43 |
| | | | 340/436 |
| 2012/0277958 A1* | 11/2012 | Trombke | E05F 15/70 |
| | | | 701/48 |
| 2015/0009062 A1* | 1/2015 | Herthan | E05B 83/16 |
| | | | 342/70 |
| 2016/0057273 A1* | 2/2016 | Bochen | H04M 1/72533 |
| | | | 455/420 |
| 2017/0154482 A1* | 6/2017 | Osborne | G07C 9/00309 |
| 2018/0216395 A1* | 8/2018 | Naserian | E05F 15/70 |
| 2019/0323280 A1* | 10/2019 | Ghannam | E05F 15/42 |

* cited by examiner

*Primary Examiner* — Yazan A Soofi (57) ABSTRACT

A method for controlling an automatic liftgate in a vehicle includes detecting a garage door frame of a garage using a front camera or a rear camera mounted on the vehicle, determining a garage height of the garage door frame, determining whether the vehicle has entered the garage, and setting a custom height to which the automatic liftgate can open to the garage height of the garage door frame when the vehicle has entered the garage.

20 Claims, 5 Drawing Sheets

SYSTEM AND METHOD FOR CONTROLLING AN AUTOMATIC LIFTGATE IN A MOTOR VEHICLE

INTRODUCTION

The present disclosure relates generally to a method and system for controlling an automatic liftgate in a vehicle, and more particularly a method and system for automatically controlling the maximum height to which an automatic liftgate opens.

Automatic liftgates, i.e. liftgates that provide access to a trunk or rear area of a vehicle that are configured to open and close automatically when a user activates a control, have become ubiquitous in modern motor vehicles. Generally, these automatic liftgates open to a predetermined, fixed maximum height when activated that allow for optimum access to the trunk or rear of the motor vehicle. However, in certain conditions, such as when parking in a garage or structure with a low ceiling or garage door, positioned above the liftgate, there is a possibility that the liftgate may contact the ceiling or garage door when opened to the maximum height. Contact between the liftgate and the ceiling or garage door may damage the ceiling or garage door. One solution is to allow a user of the motor vehicle to manually program height presets for the liftgate that are less than the maximum height. While this solution is useful, the manual programming requires time by the user to set up the height presets and specialized human-machine-interfaces (HMI), such as switches, to allow for programming and selection of the height presets. Accordingly, there is a need in the art for a method and system for automatically controlling the height of an automatic liftgate to avoid ceilings and garage doors associated with a garage or structure.

SUMMARY

According to several aspects, a method for controlling an automatic liftgate in a vehicle is provided. The method includes detecting a garage door frame of a garage using a front camera or a rear camera mounted on the vehicle, determining a garage height of the garage door frame, determining whether the vehicle has entered the garage, and setting a custom height to which the automatic liftgate can open to the garage height of the garage door frame when the vehicle has entered the garage.

In one aspect, the method further includes determining a vehicle speed of the vehicle and wherein detecting the garage door frame occurs if the vehicle speed is less than the speed threshold.

In another aspect, the threshold is about 5 mph.

In another aspect, the method further includes determining an operating state of the vehicle and wherein detecting the garage door frame occurs if the operating state of the vehicle is in Drive or Reverse.

In another aspect, the garage height of the garage door frame is measured from an upper horizontal edge to a lower horizontal edge of the garage door frame.

In another aspect, the method further includes setting the automatic liftgate to open to a maximum height if the motor vehicle has not entered the garage.

In another aspect, determining the garage height of the garage door frame includes using an edge detection and classification algorithm to detect an upper horizontal edge and a lower horizontal edge of the garage door frame and to provide a confidence metric to the garage height.

In another aspect, the method further includes setting a fully open height to which the automatic liftgate can open if the confidence metric is below a threshold.

In another aspect, determining the garage height of the garage door frame includes using a convolutional neural network (CNN) algorithm.

In another aspect, the method further includes comparing the garage height to a range of standardized garage heights to determine if the garage height is within an expected range.

In another aspect, the method further includes determining whether the motor vehicle is at a home location.

In another aspect, the method further includes saving the garage height and associating the garage height to the home location if the motor vehicle is at the home location.

In another aspect, determining whether the motor vehicle is at the home location includes determining if a user switch in the motor vehicle was activated to open the garage.

In another aspect, determining whether the motor vehicle is at the home location includes using a Global Navigation Satellite System (GNSS) in the motor vehicle to determine if the motor vehicle is at the home location.

In another aspect, determining whether the motor vehicle is at the home location includes using a vehicle communication system to determine if the motor vehicle has connected to a known Wi-Fi network at the home location.

In another aspect, the method further includes notifying a user of the motor vehicle when the automatic liftgate is set to open at the garage height.

In another aspect, the method further includes storing the garage height if the motor vehicle is keyed off, determining whether the motor vehicle has moved when the motor vehicle is keyed back on, and setting the automatic liftgate to open to the garage height if the motor vehicle has not moved.

In another aspect, the method further includes setting the custom height to which the automatic liftgate can open to the garage height less an offset amount when the vehicle has entered the garage.

According to several other aspects, a system for controlling an automatic liftgate in a motor vehicle is provided. The system includes memory storing computer executable instructions, and at least one processor configured to read and execute the computer executable instructions, the computer executable instructions causing the at least one processor to: detect a garage door frame of a garage using a front camera or a rear camera mounted on the vehicle, determine a garage height of the garage door frame, determine whether the vehicle has entered the garage, and set a custom height to which the automatic liftgate can open to the garage height of the garage door frame when the vehicle has entered the garage.

According to several other aspects, A system for controlling an automatic liftgate in a motor vehicle includes an automatic liftgate connected to the motor vehicle, a motor connected to the automatic liftgate, the motor configured to move the automatic liftgate between a closed position, an open position, and a custom position upon receipt of an input command, a liftgate control module in communication with the motor, a camera mounted to the motor vehicle, a video processing module in communication with the liftgate control module and the camera, wherein the video processing module detects a garage door frame of a garage using the camera and determines a garage height of the garage door frame. The liftgate control sets the custom position to which the automatic liftgate can open to the garage height of the garage door frame when the vehicle has entered the garage.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
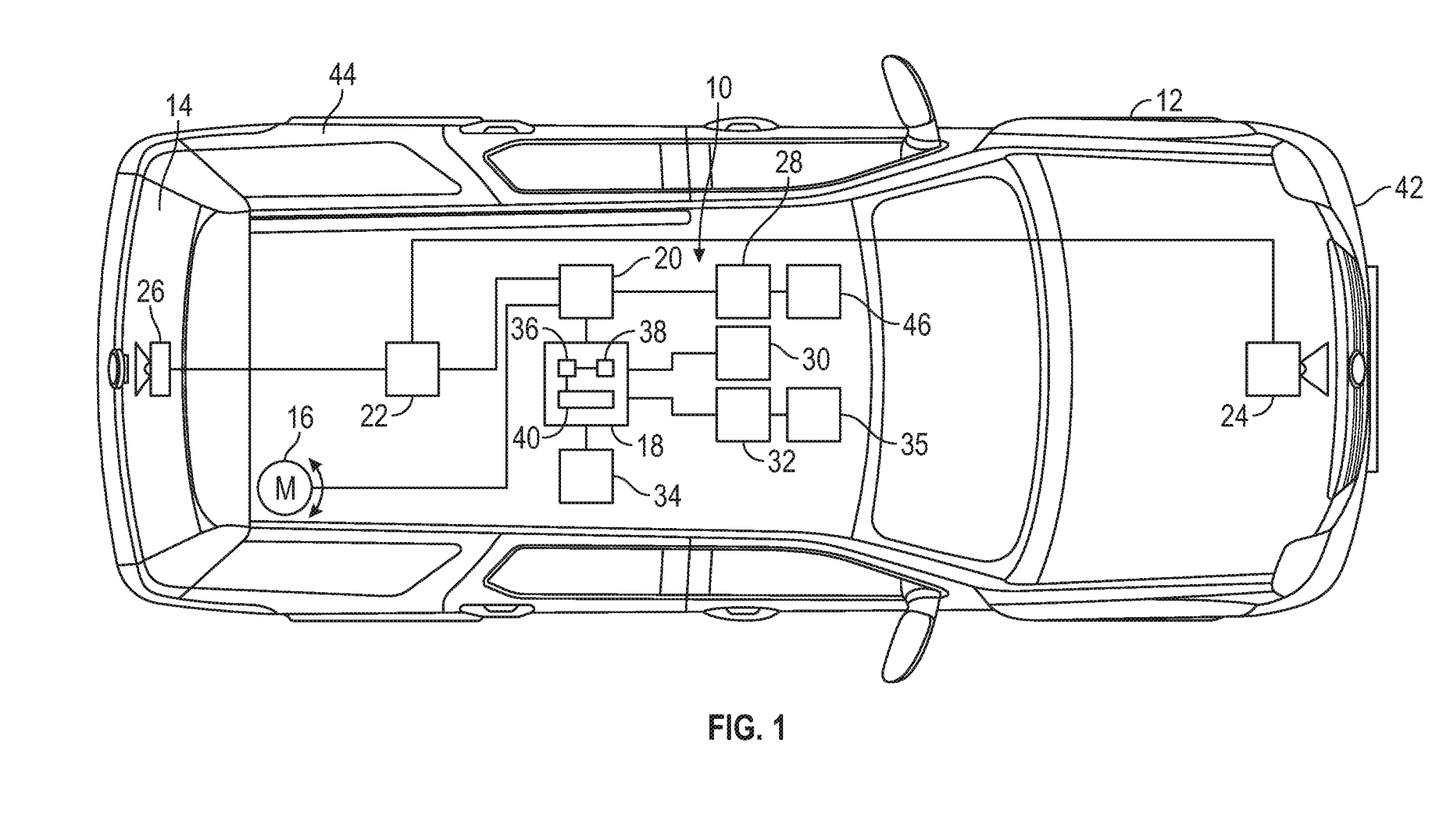
FIG. 1 is a schematic view of a system for controlling an automatic liftgate in an exemplary motor vehicle.

Referring to FIG. 1, a system for controlling an automatic liftgate is generally indicated by reference number 10. The system 10 is shown with an exemplary motor vehicle 12. The motor vehicle 12 includes an automatic liftgate 14. An electric motor 16 is connected to the automatic liftgate 14. The electric motor 16 is configured to open and close the automatic liftgate 14 upon receipt of a command input. While in the particular example provided the motor vehicle 12 is illustrated as an SUV, it should be appreciated that the motor vehicle 12 may be any type of vehicle having an automatic liftgate. The system 10 is configured to provide command inputs to the electric motor 16 to control an opening height of the automatic liftgate 14 based on sensed conditions, as will be described below, to avoid the automatic liftgate 14 from striking an object. In the example provided, the system 10 includes the automatic liftgate 14 and electric motor 16 as well as a central control module 18, a liftgate control module 20, a video processing module 22, a front camera 24, a rear camera 26, a driver notification system 28, a Global Navigation Satellite System (GNSS) 30, a vehicle communication system 32, and a vehicle garage door opener switch system 34.

The central control module 18 is configured to send and/or receive information via a vehicle communication bus from the liftgate control module 20, the GNSS 30, the vehicle communication system 32, and the vehicle garage door opener switch system 34. The central control module 18 also communicates with and receives information from other vehicle modules via the vehicle communication bus such as an engine control module and a transmission control module. For example, the central control module 18 receives a vehicle speed from the engine control module and a transmission operating status from the transmission control module. The transmission operating status is indicative of whether a transmission in the motor vehicle 2 is in Drive, Park, Neutral, Reverse, etc. In one aspect of the present disclosure, the central control module 18 is a vehicle body control module. The central control module 18 is a non-generalized, electronic control device or controller having a preprogrammed digital computer or processor 36, memory or non-transitory computer readable medium 38 used to store data such as control logic, software applications, computer executable instructions, computer code, data, lookup tables, etc., and any number of input/output ports 40. The processor 36 may be a microprocessor, a central processing unit (CPU), a graphics processor, Application Specific Integrated Circuits (ASICs), Field-Programmable Gate Arrays (FPGAs), state machines, circuitry, and a combination of hardware, software and firmware components. The computer readable medium 38 includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device. Computer code includes any type of program code, including source code, object code, and executable code. The processor 36 is configured to execute the code or instructions. The processor 36 is in communication with the non-transitory computer readable medium 38 and the input/output ports 40.

Figure 2A:
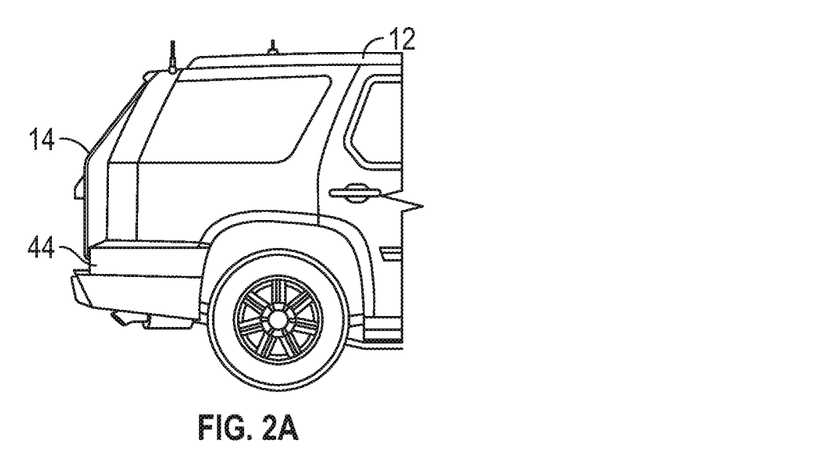
FIG. 2A is side view of an automatic liftgate in a closed position.
Figure 2B:
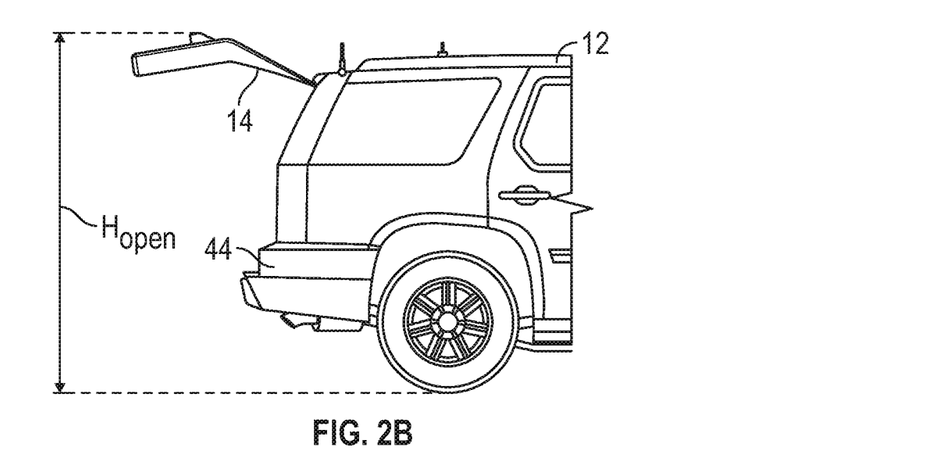
FIG. 2B is side view of an automatic liftgate in a fully open position.
Figure 2C:
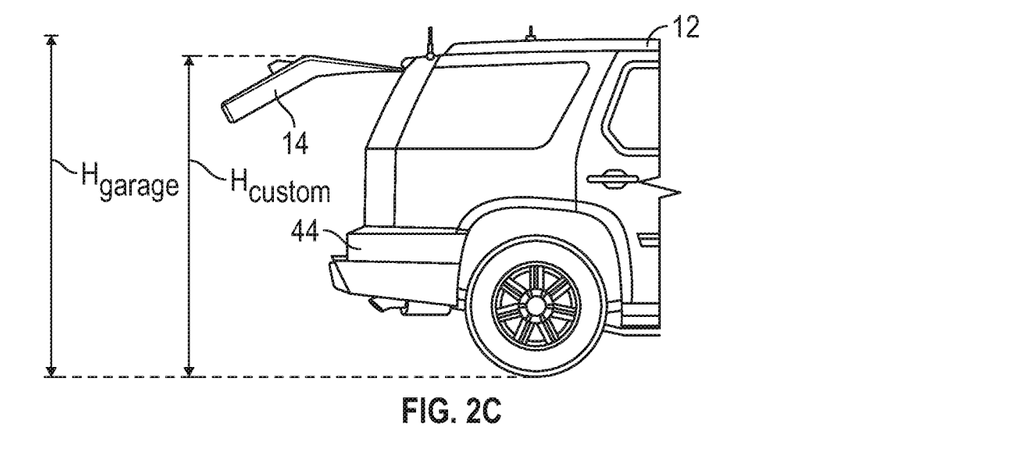
FIG. 2C is side view of an automatic liftgate in custom open position.

The liftgate control module 20 is configured to control the automatic liftgate 14 based on information received from the video processing module 22 and the central control module 18. The liftgate control module 20 may be integrated with the central control module 18 or may be a separate control module having a processor, computer readable medium, input/outputs, etc., as described above. The liftgate control module 20 is configured to send command inputs to the electric motor 16 to move the automatic liftgate between at least three positions, examples of which are shown in FIGS. 2A, 2B and 2C. In FIG. 2A, the automatic liftgate 14 is in a closed position. In FIG. 2B, the automatic liftgate 14 is in a maximum open position. In the maximum open position, a distance measured from a highest point on the automatic liftgate 14 to the ground is defined by reference "$H_{max}$". $H_{max}$ is the fully open position of the automatic liftgate 14. In FIG. 2C, the automatic liftgate 14 is in a custom open position. In the custom open position, a distance measured a highest point on the automatic liftgate 14 to the ground is defined by reference "$H_{custom}$". $H_{custom}$ is less than $H_{max}$ and is set by the liftgate control module 20, as will be described below.

Returning to FIG. 1, the video processing module 22 is configured to process image data received form the front camera 24 and the rear camera 26. The video processing module 22 may be separated into two separate modules each associated with one of the front camera 24 and the rear camera 26. The video processing module 22 includes a processor, computer readable medium, input/outputs, etc., as described above.

The front camera 24 is mounted to a front portion 42 of the motor vehicle 12. The front camera 24 provides forward, visual image data from an area in front of the motor vehicle 12. The forward image data is communicated to the video processing module 22 for image analysis. It should be appreciated that more than one front facing camera may be used with the system and method described herein.

The rear camera 26 is mounted to the automatic liftgate 14 or to a rear portion 44 of the motor vehicle 12. The rear camera 26 provides rearward, visual image data from an area to the rear of the motor vehicle 12. The rearward image data is communicated to the video processing module 22 for image analysis. It should be appreciated that more than one rear facing camera may be used with the system and method described herein.

The driver notification system 28 is in communication with the liftgate control module 20 and is configured to provide an indication to the driver or user of the motor vehicle 12 of a status of the automatic liftgate 14. The driver notification system 28 communicates with a display device or human machine interface (HMI) 46. Examples of the HMI 46 include an infotainment screen in the motor vehicle 12, a dashboard or overhead indicator light, etc. The status of the automatic liftgate 14 includes one or more of an indication that the automatic liftgate 14 is closed (shown in FIG. 2A), that the automatic liftgate 14 is open to height $H_{max}$ (shown in FIG. 2B), or that the automatic liftgate 14 is opened to height $H_{custom}$ (shown in FIG. 2C).

The Global Navigation Satellite System (GNSS) 30 includes various subsystems and modules configured to provide real-time position data of the motor vehicle 12. For example, the GNSS 30 may include GPS data.

The vehicle communication system 32 is configured to communicate wirelessly with a Wi-Fi network remote from the motor vehicle 12 using Wi-Fi protocols under IEEE 802.11x and/or with a telecommunications network using cellular data communication protocols such as LTE, etc. The vehicle communication system 32 includes a wireless transceiver/receiver for communicating data.

The vehicle garage door opener switch system 34 is configured to communicate with a garage door opener. The vehicle garage door opener switch system 34 communicates with a programmable user switch 35 for activating the garage door opener.

Figure 3:
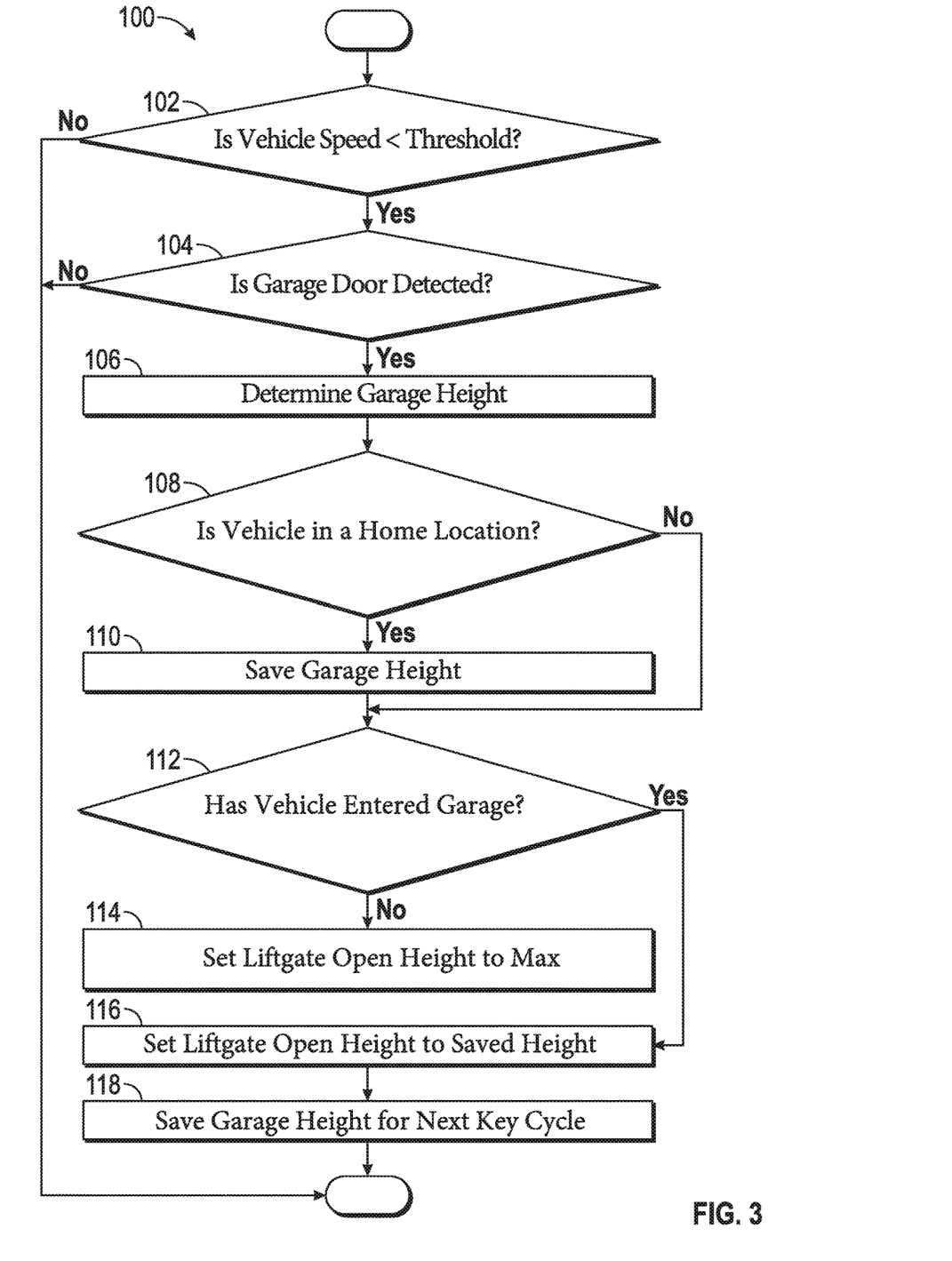
FIG. 3 is a flow chart illustrating an exemplary embodiment of a method for controlling the automatic liftgate.

With reference to FIG. 3, a method for controlling the automatic liftgate 14 using the system 10 is generally indicated by reference number 100. The method 100 begins at block 102 where the liftgate control module 20 determines whether the vehicle speed, provided by the engine control module, is less than a threshold. In one example, the threshold is about 5 mph. As used herein, the term "about" is known to those skilled in the art. Alternatively, the term "about" means+/−3 mph. Alternatively, the liftgate control module 20 determines if the transmission status is in Drive, Reverse, or another mode of operation indicating forward or reverse movement. If the vehicle speed is greater than the threshold or the vehicle is in Park or Neutral, the method 100 ends. If the vehicle speed is less than or equal to the threshold or the vehicle is in Drive or Reverse, the method 100 proceeds to block 104.

Figure 4:
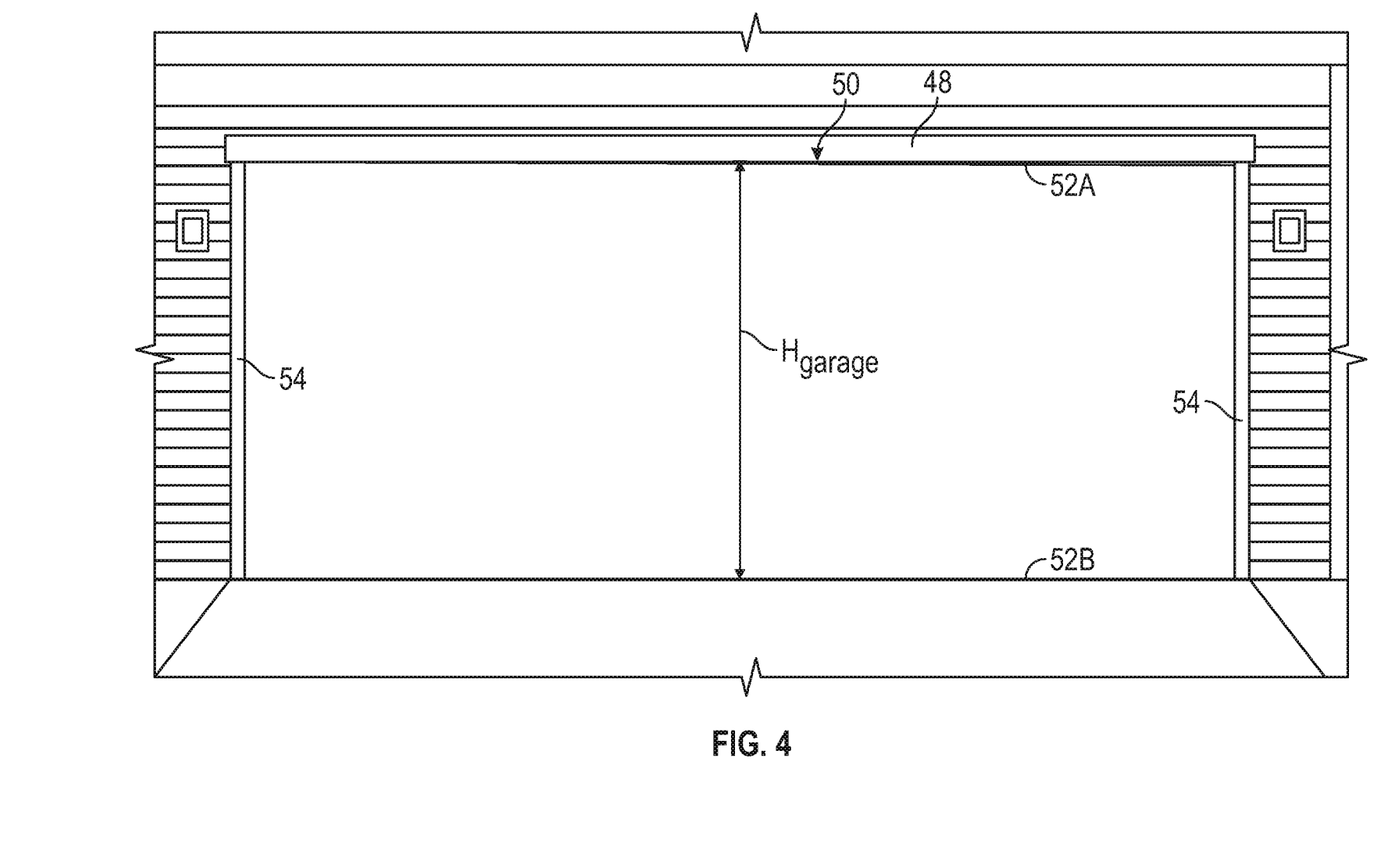
FIG. 4 is a front view of an exemplary garage.

At block 104 the video processing module 22 determines whether a garage door frame is detected in the front camera 24 or the rear camera 26. An example of a garage door frame is shown in FIG. 4 and indicated by reference number 48. The garage door frame 48 surrounds a garage 50. The garage door frame 48 is defined by an upper horizontal edge 52A, a lower horizontal edge 52B, and vertical edges 54. The garage door frame 48 is indicative of the lowest position from which the garage door and garage door opener will hang from a ceiling in the garage 50. Returning to FIG. 3, if the video processing module 22 does not detect the garage door frame 48, the method 100 ends. If the video processing module 22 detects the garage door frame 48, the method 100 proceeds to block 106.

At block 106, the video processing module 22 determines a garage height or "$H_{garage}$", as shown in FIG. 4. $H_{garage}$ is measured from the upper and lower horizontal edges 52A, 52B. $H_{garage}$ may be measured in a number of ways. In one aspect, $H_{garage}$ is determined using an edge detection and classification algorithm. The edge detection and classification algorithm detects the upper and lower horizontal edges 52A, 52B and the vertical edges 54 of the frame 48, identify garage targets and provide a confidence metric to the maximum height. If the confidence metric is less than a confidence threshold, the height to which the automatic liftgate 14 is opened is set to $H_{max}$. The edge detection and classification algorithm is well suited to determining $H_{garage}$ since most garage doors are standard sizes. In another aspect, a convolutional neural network (CNN) is used to identify and classify the garage door frame 48. The CNN algorithm identifies the garage door frame 48 and uses stereo vision or structure from motion techniques to determine $H_{garage}$. For example, using stereo vision, the image data from two cameras with a known baseline distance between them is compared and the disparity between the images is used to determine $H_{garage}$. Using structure from motion techniques, only one camera is needed and consecutive frames of image data are recorded and compared. Vehicle information is used to determine a distance traveled between each image. The distance traveled between each image provides the disparity to estimate $H_{garage}$. In another aspect, a fused method is employed where other sensors, such as radar, lidar, ultrasound, etc., are used to provide distance to the garage door frame 48. With an accurate distance, the known height of the camera, an angle from the camera to upper bound of the garage door frame 48, and an angle to the lower bound of the garage door frame 48 may be used to determine $H_{garage}$. In another aspect, the video processing module 22 checks $H_{garage}$ against known garage door heights to confirm that $H_{garage}$, as determined, is within an expected range.

After determining $H_{garage}$, the method proceeds to block 108 where the central control module 18 determines whether the motor vehicle 12 is in a "home" location. To determine whether the motor vehicle 12 is in the home location, the central control module 18 communicates with the vehicle garage door opener switch system 34 to determine if the user switch 35 has been activated. If the user switch 35 to open the garage 50 has been activated, the motor vehicle 12 is in a home location. In another embodiment, the central control module 18 communicates with the Global Navigation Satellite System (GNSS) 30 to determine if the motor vehicle 12 is located at the home location. In yet another embodiment, the central control module 18 communicates with the vehicle communication system 32 to determine if the motor vehicle 12 has connected to a known Wi-Fi network. If the motor vehicle 12 has connected to a known Wi-Fi network, the motor vehicle 12 is in the home location. The various methods of determining whether the motor vehicle 12 is at the home location may be fused to increase the confidence level of the home location. If the motor vehicle 12 is at the home location, the method proceeds to block 110 and if the motor vehicle 12 is not at the home location the method proceeds to block 112. At block 110 $H_{garage}$ is saved and associated with the garage 50 at the home location. Saved $H_{garage}$ may then be recalled and used when at the home location and/or used as a check when determining $H_{garage}$ at the home location.

At block 112, the central control module 18 communicates with the video processing module 22 to determine whether the motor vehicle 12 has entered the garage 50. The speed of the motor vehicle 12 along with video processing techniques as described above are used to determine if the motor vehicle 12 has entered the garage 50. If the motor vehicle 12 has not entered the garage 50, the method 100 proceeds to block 114 where the liftgate control module 20 sets the height to which the automatic liftgate 14 opens to $H_{max}$. If the motor vehicle 12 has entered the garage 50, the method proceeds to block 116 where the liftgate control module 20 sets $H_{custom}$ to $H_{garage}$ and sets the height to which the automatic liftgate 14 opens to $H_{custom}$. In one aspect, $H_{custom}$ is set to $H_{garage'}$, where $H_{garage'}$ is less than $H_{garage}$ by an offset amount, such as 6 inches. In addition, the liftgate control module 20 communicates with the driver notification system 28 to signal through the HMI 46 that the automatic liftgate 14 is set to open to $H_{custom}$ rather than $H_{max}$. By setting the height to which the automatic liftgate 14 opens to $H_{garage}$, the automatic liftgate 14 is prevented from hitting the garage door or garage door opener in the garage 50. Finally, at block 118, $H_{garage}$ is stored in memory for the next key cycle, i.e., for when the motor vehicle 12 is turned back on.

Figure 5:
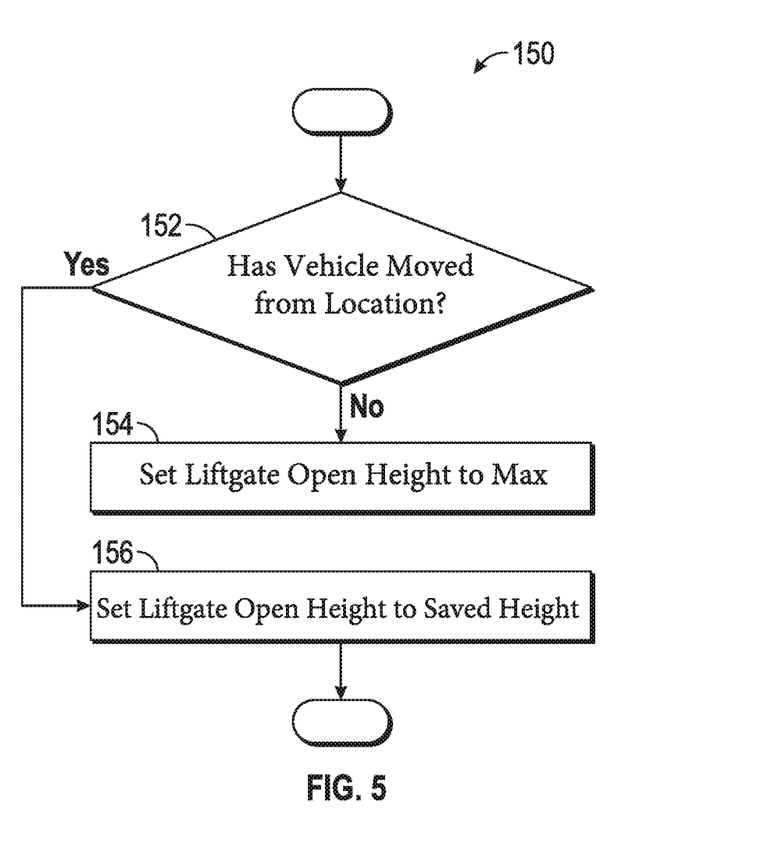
FIG. 5 is a flow chart illustrating an exemplary embodiment of a method for controlling the automatic liftgate after a key off event.

Turning to FIG. 5, a method 150 used after the motor vehicle 12 has restarted is shown. The method 150 begins at block 152 after $H_{custom}$ has been set to $H_{garage}$, $H_{garage}$ has been stored, and the motor vehicle 12 has been turned off then turned back on. At block 152 the central control module 18 communicates with the GNSS 30 to determine if the motor vehicle 12 has moved from the location from where the motor vehicle 12 was keyed off. If the motor vehicle 12 has moved, then the method 152 proceeds to block 154 where the automatic liftgate 14 is set to open to $H_{max}$. If the motor vehicle 12 has not moved, then at block 156 the height to which the automatic liftgate 14 is set to open is $H_{custom}$, where $H_{custom}$ has been set to $H_{garage}$. Thus, the motor vehicle 12 will only open the automatic liftgate 14 to the height that does not strike an obstacle in the garage 50.

The system 10 and method 100 allows the motor vehicle 12 to automatically control the height to which the automatic liftgate 14 opens based on the environment to avoid hitting the garage door or garage door opener in a garage. The system 10 and method 100 advantageously uses equipment found on the motor vehicle 12 while eliminating additional switches and HMI devices.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A method for controlling an automatic liftgate in a vehicle, the method comprising:
   detecting a garage doorframe of a garage using a front camera or a rear camera mounted on the vehicle;
   determining a garage height of the garage door frame;
   determining whether the vehicle has entered the garage; and
   setting a custom height to which the automatic liftgate can open to the garage height of the garage door frame when the vehicle has entered the garage.

2. The method of claim 1 further comprising determining a vehicle speed of the vehicle and wherein detecting the garage door frame occurs if the vehicle speed is less than a speed threshold.

3. The method of claim 2 wherein the speed threshold is about 5 mph.

4. The method of claim 1 further comprising determining an operating state of the vehicle and wherein detecting the garage door frame occurs if the operating state of the vehicle is in Drive or Reverse.

5. The method of claim 1 wherein the garage height of the garage door frame is measured from an upper horizontal edge to a lower horizontal edge of the garage door frame.

6. The method of claim 1 further comprising setting the automatic liftgate to open to a maximum height if the vehicle has not entered the garage.

7. The method of claim 1 wherein determining the garage height of the garage door frame includes using an edge detection and classification algorithm to detect an upper horizontal edge and a lower horizontal edge of the garage door frame and to provide a confidence metric to the garage height.

8. The method of claim 7 further comprising setting a fully open height to which the automatic liftgate can open if the confidence metric is below a threshold.

9. The method of claim 1 wherein determining the garage height of the garage door frame includes using a convolutional neural network (CNN) algorithm.

10. The method of claim 1 further comprising comparing the garage height to a range of standardized garage heights to determine if the garage height is within an expected range.

11. The method of claim 1 further comprising determining whether the vehicle is at a home location.

12. The method of claim 11 further comprising saving the garage height and associating the garage height to the home location if the vehicle is at the home location.

13. The method of claim 12 wherein determining whether the vehicle is at the home location includes determining if a user switch in the vehicle was activated to open the garage.

14. The method of claim 12 wherein determining whether the vehicle is at the home location includes using a Global Navigation Satellite System (GNSS) in the vehicle to determine if the vehicle is at the home location.

15. The method of claim 12 wherein determining whether the vehicle is at the home location includes using a vehicle communication system to determine if the vehicle has connected to a known Wi-Fi network at the home location.

16. The method of claim 1 further comprising notifying a user of the vehicle when the automatic liftgate is set to open at the garage height.

17. The method of claim 1 further comprising storing the garage height if the vehicle is keyed off, determining whether the vehicle has moved when the vehicle is keyed back on, and setting the automatic liftgate to open to the garage height if the vehicle has not moved.

18. The method of claim 1 further comprising setting the custom height to which the automatic liftgate can open to the garage height less an offset amount when the vehicle has entered the garage.

19. A system for controlling an automatic liftgate in a motor vehicle, the system comprising:
   memory storing computer executable instructions; and
   at least one processor configured to read and execute the computer executable instructions, the computer executable instructions causing the at least one processor to:
      detect a garage door frame of a garage using a front camera or a rear camera mounted on the vehicle;
      determine a garage height of the garage door frame;
      determine whether the vehicle has entered the garage; and
      set a custom height to which the automatic liftgate can open to the garage height of the garage doorframe when the vehicle has entered the garage.

20. A system in a motor vehicle, the system comprising:

an automatic liftgate connected to the motor vehicle;

a motor connected to the automatic liftgate, the motor configured to move the automatic liftgate between a closed position, an open position, and a custom position upon receipt of an input command;

a liftgate control module in communication with the motor;

a camera mounted to the motor vehicle;

a video processing module in communication with the liftgate control module and the camera, wherein the video processing module detects a garage door frame of a garage using the camera and determines a garage height of the garage door frame;

wherein the liftgate control sets the custom position to which the automatic liftgate can open to the garage height of the garage door frame when the vehicle has entered the garage.

\* \* \* \* \*